US005974971A

United States Patent [19]

Möller et al.

[11] Patent Number: 5,974,971

[45] Date of Patent: Nov. 2, 1999

[54] METHOD AND DEVICE FOR FEEDING PRINTING INK IN AN INKING UNIT OF A PRINTING PRESS

[75] Inventors: Renko Möller, Sendenhorst; Hubert Peick, Oelde, both of Germany

[73] Assignee: Heidelberger Druckmaschinen Aktiengesellschaft, Heidelberg, Germany

[21] Appl. No.: 09/217,856

[22] Filed: Dec. 21, 1998

[30] Foreign Application Priority Data

Dec. 20, 1997 [DE] Germany .......................... 197 57 161

[51] Int. Cl.[6] .............................. B41F 31/02; B41F 1/54; G01F 11/06; G01F 11/42

[52] U.S. Cl. .......................... 101/366; 101/484; 222/325; 222/389

[58] Field of Search .................................... 101/364–367, 101/350.1, 148, 483, 484; 346/140.1; 347/86, 87; 222/20, 55, 61, 71, 96, 105, 162, 163, 181.1, 185.1, 635, 209, 212, 249, 250, 285, 309, 319, 321.6, 321.7–321.9, 325, 372, 373, 378, 384, 389, 400.5

[56] References Cited

U.S. PATENT DOCUMENTS

| | | | |
|---|---|---|---|
| 1,180,629 | 4/1916 | Andrews | 101/364 |
| 1,962,156 | 6/1934 | Rowell | 101/367 |
| 2,773,446 | 12/1956 | Koeber, Jr. | 101/233 |
| 3,145,653 | 8/1964 | Lake | 101/364 |
| 4,699,054 | 10/1987 | Scrudato et al. | 101/330 |
| 4,787,313 | 11/1988 | Osborn et al. . | |
| 4,978,042 | 12/1990 | Fidler | 222/642 |
| 5,427,136 | 6/1995 | Weishew | 137/392 |
| 5,435,462 | 7/1995 | Fujii . | |
| 5,553,740 | 9/1996 | King et al. | 222/1 |
| 5,765,722 | 6/1998 | Beebe et al. | 222/1 |
| 5,799,578 | 9/1998 | Junghans . | |
| 5,878,667 | 3/1999 | Ryan | 101/366 |

FOREIGN PATENT DOCUMENTS

| | | | |
|---|---|---|---|
| 459755 | 12/1991 | European Pat. Off. | B41F 31/02 |
| 37 14 160 A1 | 11/1987 | Germany . | |
| 36 32 948 A1 | 3/1988 | Germany . | |
| 94 06 347 U1 | 7/1994 | Germany . | |
| 359109369 | 6/1984 | Japan | 347/86 |
| 2003793 | 3/1979 | United Kingdom | 347/86 |

*Primary Examiner*—Kimberly L. Asher
*Attorney, Agent, or Firm*—Herbert L. Lerner; Laurence A. Greenberg

[57] ABSTRACT

The invention relates to a method and a device for feeding printing ink in an inking unit of a printing press having an ink fountain to which, for the purpose of metered filling, there is assigned a cartridge in a holder, the cartridge having a displaceable cartridge piston, which is acted upon pneumatically for the purpose of pressure discharge, and having at the other end a closable outlet opening. The device includes a holder for the cartridge, the holder having a controllable pneumatic connection, and a valve that is closed when the cartridge is being acted upon by pressure. Also provided are a spacing or distance sensor for determining the position of the cartridge piston in the upper part of the holder, and a pneumatic actuator for opening the cartridge valve, pressure being applied separately to the cartridge and to the actuator. The method provides for the cartridge to be acted upon by a pneumatic operating pressure, for the position of the cartridge piston to be determined, for the cartridge valve to be opened, for the cartridge piston to be moved into a preset desired position, and for the cartridge valve to be closed when this position is reached.

6 Claims, 3 Drawing Sheets

Fig. 3a
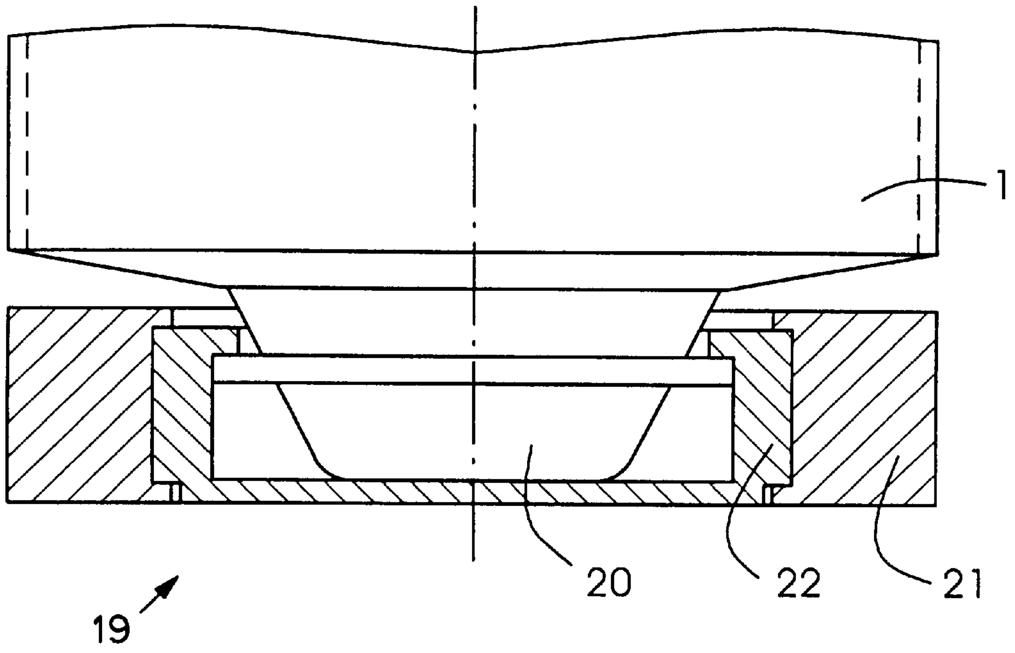
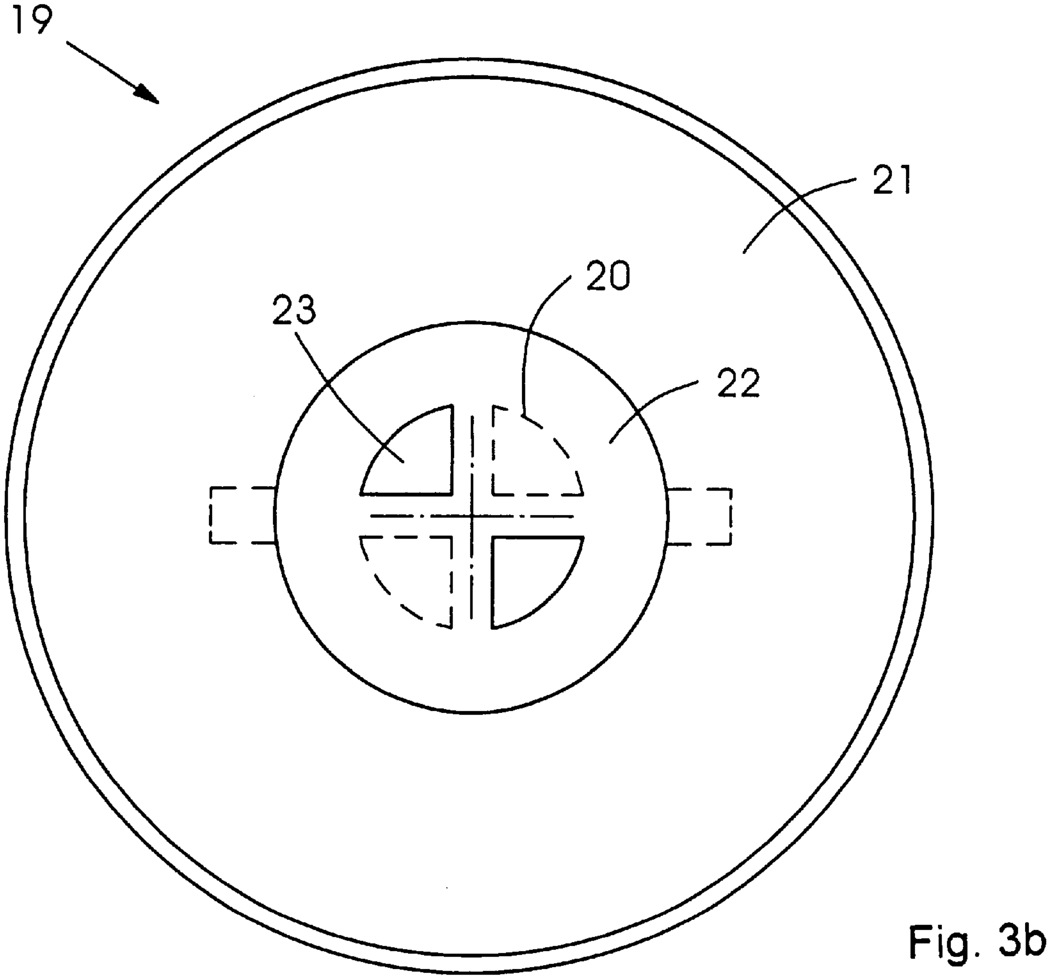
Fig. 3b

METHOD AND DEVICE FOR FEEDING PRINTING INK IN AN INKING UNIT OF A PRINTING PRESS

BACKGROUND OF THE INVENTION

Field of the Invention

The invention relates to a method and a device for feeding printing ink in an inking unit of a printing press having an ink fountain to which, for the purpose of metered filling, there is assigned a cartridge in a holder, said cartridge having a displaceable cartridge piston, which is acted upon pneumatically for the purpose of pressure discharge, and having at the other end a closable outlet opening.

The published German Utility Model Document DE 295 19 348 U1 shows a pneumatic cartridge pressure discharge device of this general type for applying pressure to tubular cartridges which have a mouthpiece at a front end thereof and being closed at a rear end thereof by an inserted, displaceable cartridge bottom. In this case, the cartridge is fitted in a holder, which has a compressed-air connection for feeding compressed air into the rear end of the cartridge, in order to apply an operating pressure to the cartridge piston.

SUMMARY OF THE INVENTION

It is accordingly an object of the invention, starting from the foregoing prior art, to provide a method and a device for feeding printing ink in an inking unit of a printing press with which exact volumetric metering of the printing ink from the cartridge is made possible.

With the foregoing and other objects in view, there is provided in accordance with one aspect of the invention, a method for feeding printing ink in an inking unit of a printing press having an ink fountain to which there is assigned a cartridge in a holder for the purpose of metered filling of the ink fountain, the cartridge having a displaceable cartridge piston pneumatically acted upon at one end of the cartridge for the purpose of applying a pressure discharge thereon, the cartridge having a closable outlet opening at the other end thereof, which comprises applying a pneumatic operating pressure upon the cartridge, determining the position of the cartridge piston, opening the cartridge valve, moving the cartridge piston into a preset desired position, and closing the cartridge valve when this position is reached.

In accordance with another aspect of the invention, there is provided a device for feeding printing ink in an inking unit of a printing press having an ink fountain to which there is assigned a cartridge in a holder for the purpose of metered filling of the ink fountain, the cartridge having a displaceable cartridge piston pneumatically acted upon at one end of the cartridge for the purpose of applying a pressure discharge thereon, the cartridge having a closable outlet opening at the other end thereof, comprising a controllable pneumatic connection disposed in the holder of the cartridge, a valve that is closed when the cartridge is acted upon by pressure disposed on the holder, a spacing sensor for determining the position of the cartridge piston disposed in an upper part of the holder, and a pneumatic actuator for opening the cartridge valve, the cartridge and the actuator being disposed so as to have pressure applied separately thereto.

In accordance with another feature of the device of the invention, the spacing sensor is an ultrasonic sensor.

In accordance with a further feature of the device of the invention, the cartridge valve is a lifting valve controllable by pressure application.

In accordance with an alternative feature of the device of the invention, the cartridge valve is a hose pinch valve controllable by pressure application.

In accordance with another alternative feature of the invention, the cartridge valve is a rotary valve controllable via a pneumatic cylinder.

Thus, the method according to the invention includes the following method steps: the cartridge is acted upon by a pneumatic operating pressure, the position of the cartridge piston is determined, the cartridge valve is opened, the cartridge piston is moved into a preset desired position and the cartridge valve is then closed when this position is reached. Using these method steps, the quantity of ink fed can be metered exactly, so that it is possible to operate in the printing press even with minimum quantities of ink in the ink fountain.

Furthermore, the object is achieved by a device wherein a holder of the cartridge has a controllable pneumatic connection, a valve which is closed when the cartridge is being acted upon by pressure is disposed on the holder, a spacing or distance sensor for determining the position of the cartridge piston is provided in an upper part of the holder, and a pneumatic actuator is provided to open the cartridge valve, pressure being applied separately to the cartridge and to the actuator. Using this simple solution, the ink feed in the ink fountain can be automated, i.e., it is possible to feed a precisely metered quantity of ink in accordance with the respective demand.

In an advantageous refinement of the invention, the distance or spacing sensor is constructed as an ultrasonic sensor. An exact measurement of the travel of the cartridge piston is achieved with this cost-effective sensor.

A further advantageous refinement of the invention is that the cartridge valve is constructed as a lifting valve which can be controlled by applying pressure. In an alternative thereto, the cartridge valve is constructed as a hose pinch valve which can likewise be controlled by applying pressure. A further alternative for the cartridge valve is to construct it as a rotary valve which can be controlled via a pneumatic cylinder. These different refinements of the cartridge valve may be selected depending upon the particular application, and permit precise metering of the printing ink.

Other features which are considered as characteristic for the invention are set forth in the appended claims.

Although the invention is illustrated and described herein as embodied in a method and device for feeding printing ink in an inking unit of a printing press, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, wherein:

BRIEF DESCRIPTION OF THE DRAWINGS

FIGS. 3*a* and 3*b*, are a view like that of FIG. 2 and a bottom plan view, respectively, of another different embodiment of the device according to the invention having a rotary valve.

DESCRIPTION OF THE PREFERRED EMBODIMENTS

Figure 1:
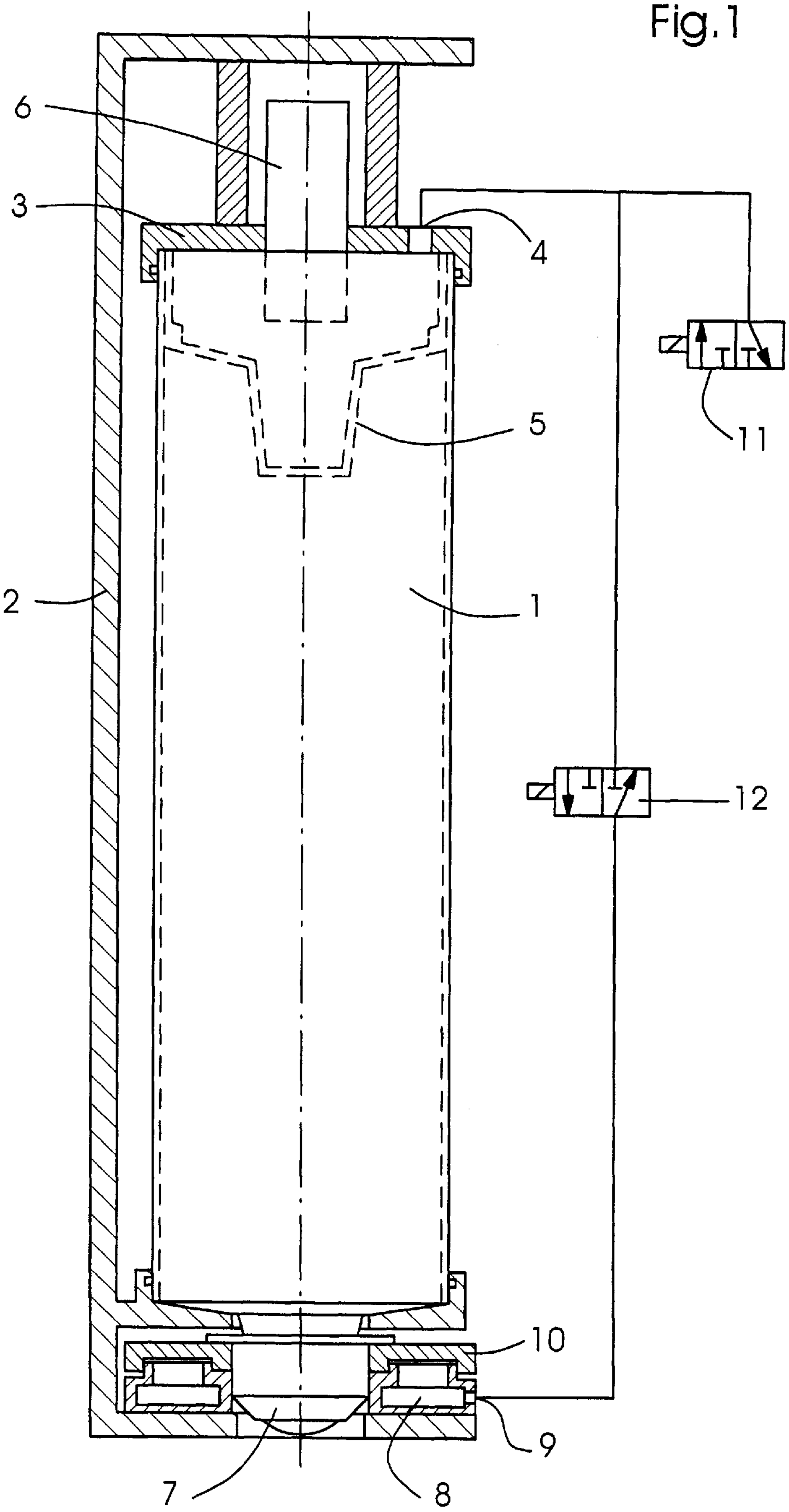
FIG. 1 is a diagrammatic and schematic side elevational view, partly in section, of the device, with cartridge and lifting a valve, in accordance with the invention.

Referring now to the drawings and, first, particularly to FIG. 1 thereof, there is shown therein a cartridge 1 that is filled with printing ink, is inserted in a holder 2 and is disposed above an otherwise non-illustrated ink fountain forming part of an inking unit, it being possible for the holder 2, together with the cartridge 1, to move in the longitudinal direction of the ink fountain in order to supplement the supply of ink in the ink fountain in various regions thereof. Placed onto the cartridge 1, at the top thereof, is a sealing plate 3, which is supported on the holder 2 and has a compressed-air connection 4, with which a cartridge piston 5 can be acted upon pneumatically. Moreover, arranged in the sealing plate 3 is a sensor 6, that can be constructed as an ultrasonic sensor and that can measure the respective position of the cartridge piston 5 in the cartridge 1 and transmit the measurement result to a control device.

Provided at the lower end of the cartridge 1 is a cartridge valve 7, which may be constructed as a lifting valve. Provided therefor in the lower part of the holder 2 is a lifting device 8, that has a compressed-air connection 9, which opens the cartridge valve 7 via a lifting plate 10.

The application of pressure to the cartridge piston 5 may be controlled via a valve 11, which cooperates with a further valve 12, via which the cartridge valve 7 is opened. The control unit, which is otherwise not illustrated but which also receives the signals from the sensor 6, initially acts upon the cartridge piston 5 with a constant operating pressure, via the valve 11, with the cartridge valve 7 closed. Once the position of the cartridge piston 5 has been determined, the cartridge valve 7 is opened, via the valve 12, until the cartridge piston 5 has moved into a preset desired position, which corresponds to a specific pressure-discharged quantity of ink. When this desired position is reached, the application of pressure to the cartridge valve 7 via the valve 12 is interrupted, so that the cartridge valve 7 is closed again, this being performed automatically via the application of pressure to the cartridge piston 5 or, in other words, when this desired position is reached, the cartridge valve 7 has pressure applied thereto via the valve 12, so that the cartridge valve 7 is closed, this occurring automatically via the application of pressure to the lifting device 8.

Figure 2:
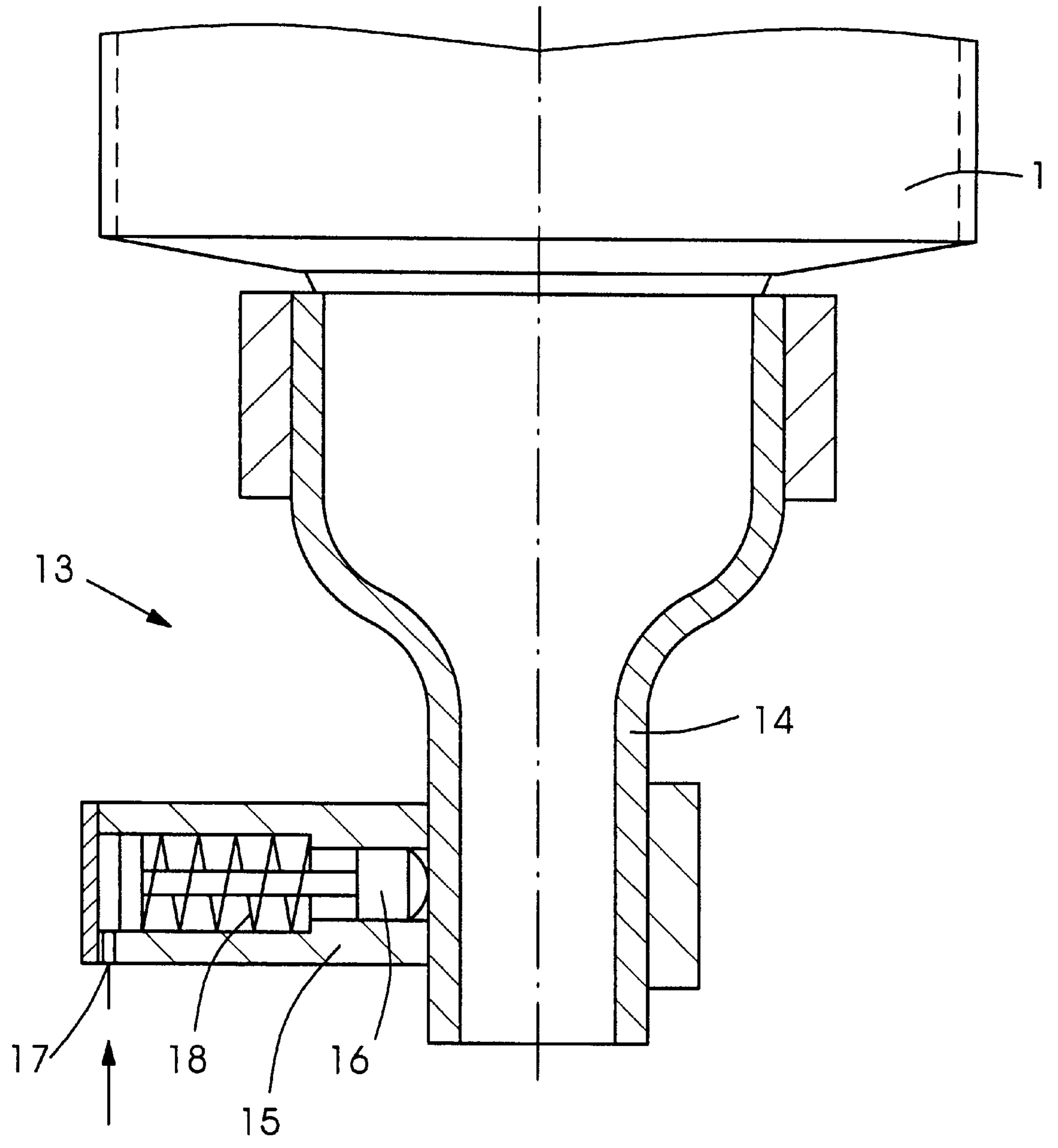
FIG. 2 is an enlarged fragmentary sectional view of FIG. 1 showing a different embodiment of the device according to the invention having a hose pinch valve.

FIG. 2 shows a hose pinch valve 13, which is provided at the outlet opening of the cartridge 1. The hose pinch valve 13 includes a hose 14, to which a valve element 15 is assigned. The valve element 15 encloses the hose 14 and contains a piston 16, with which the hose can be pinched shut. Via a compressed-air connection 17, which can be controlled by the valve 12, the piston 16 is moved until the hose 14 is closed. In order to open the hose 14, the piston 16 is moved back into the initial position thereof via a compression spring 18.

FIGS. 3*a* and 3*b* show, at the lower end of the cartridge 1, a rotary valve 19, which is provided at the outlet opening 20 of the cartridge 1. The valve element 21 has a rotary insert 22, which has similar openings 23 to the outlet openings 20. By being rotated through about 90°, the rotary insert 22 may be rotated into a closed position, as shown, or into a second position wherein the outlet openings 20 and the openings 23 of the rotary insert 22 coincide, so that ink can emerge. The control itself may be performed, for example, via a pneumatic cylinder (not illustrated) which is coupled to the rotary insert 22.

We claim:

1. A method for feeding printing ink in an inking unit of a printing press having an ink fountain to which there is assigned a cartridge in a holder for the purpose of metered filling of the ink fountain, the cartridge having a displaceable cartridge piston pneumatically acted upon at one end of the cartridge for the purpose of applying a pressure discharge thereon, the method comprising providing the cartridge with a closable outlet opening at the other end thereof and a cartridge valve, applying a pneumatic operating pressure upon the cartridge, determining the position of the cartridge piston, opening the cartridge valve, moving the cartridge piston into a preset desired position, and closing the cartridge valve when this position is reached.

2. A device for feeding printing ink in an inking unit of a printing press having an ink fountain to which there is assigned a cartridge in a holder for the purpose of metered filling of the ink fountain, the cartridge having a displaceable cartridge piston pneumatically acted upon at one end of the cartridge for the purpose of applying a pressure discharge thereon, the cartridge having a closable outlet opening at the other end thereof, comprising a controllable pneumatic connection disposed in the holder of the cartridge, a valve that is closed when the cartridge is acted upon by pressure disposed on the holder, a spacing sensor for determining the position of the cartridge piston disposed in an upper part of the holder, and a pneumatic actuator for opening the cartridge valve, the cartridge and said actuator being disposed so as to have pressure applied separately thereto.

3. The device according to claim 2, wherein said spacing sensor is an ultrasonic sensor.

4. The device according to claim 2, wherein said cartridge valve is a lifting valve controllable by pressure application.

5. The device according to claim 2, wherein said cartridge valve is a hose pinch valve controllable by pressure application.

6. The device according to claim 2, wherein said cartridge valve is a rotary valve controllable via a pneumatic cylinder.

* * * * *